Figure 1:
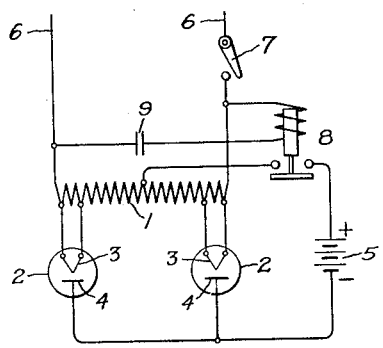

Sept. 12, 1933.  R. D. AMSDEN  1,926,708

ELECTRICAL RECTIFIER

Filed Nov. 27, 1931

Inventor:
Ralph D. Amsden,
by Charles E. Tullar
His Attorney.

Patented Sept. 12, 1933

1,926,708

UNITED STATES PATENT OFFICE 1,926,708

ELECTRICAL RECTIFIER

Ralph D. Amsden, Lynn, Mass., assignor to General Electric Company, a corporation of New York Application November 27, 1931
Serial No. 577,527

7 Claims. (Cl. 175—363)

My invention relates to electrical rectifiers and more particularly to improved protective arrangements for arc discharge type battery charging rectifiers.

Arrangements for preventing arc-backs in arc discharge type rectifiers, and particularly for preventing sustained arc-backs in rectifiers of the above mentioned type which are used for charging storage batteries from alternating current supply circuits have been proposed in the past. In the simplest form of the above mentioned arrangement the rectifier is provided with an insulated two-winding transformer and the protective equipment consists essentially of a relay which is connected to be energized from the alternating current supply and which is arranged to break the direct current output, or charging, circuit of the rectifier upon failure of the alternating current supply. It is often desirable, however, to provide rectifiers of this type with auto-transformers, rather than with insulated two-winding transformers because of the relatively lower cost of the former. I have found, however, that when auto-transformers are substituted for two-winding transformers, difficulties are encountered which impair the operation and usefulness of the above described simple protective relay arrangement. These difficulties are caused by the fact that when an arc-back occurs in a rectifier which is provided with an auto-transformer the direct current which flows in the winding of this transformer produces a voltage drop therein and this voltage drop is often sufficient to maintain the relay energized so that its contacts do not open the direct current circuit and consequently the arc-back is maintained.

In accordance with my invention I provide a plurality of alternative arrangements for automatically preventing arc-backs in arc type rectifiers which are provided with auto-transformers. I accomplish this result by so connecting the relay to the rectifier that it cannot be energized as a result of direct current flowing in the auto-transformer winding due to an arc-back, while it will be energized at times when the auto-transformer is supplied with alternating current.

While my invention is particularly applicable to rectifiers which are provided with auto-transformers, the various alternative arrangements which are disclosed are not necessarily limited to use with such rectifiers and they may also be employed with rectifiers having two winding insulated transformers if desired.

An object of my invention is to provide a new and improved arc-back preventive arrangement for electric arc discharge type rectifiers.

Another object of my invention is to provide a new and improved arrangement for preventing arc-backs in arc discharge type rectifiers which are provided with auto-transformers.

My invention will be better understood from the following description taken in connection with the accompanying drawing, and its scope will be pointed out in the appended claims.

Figure 2:
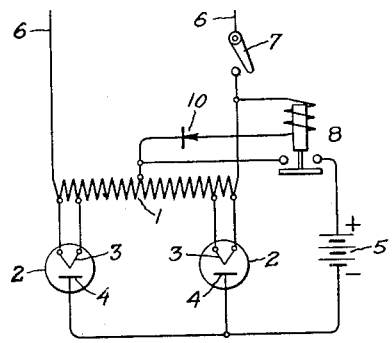
Figure 3:
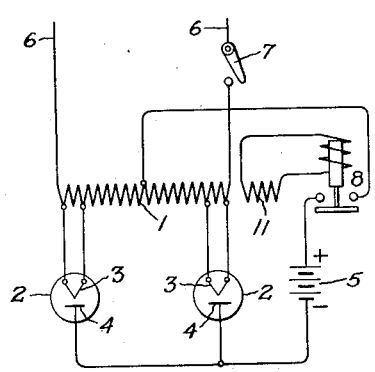
Figure 4:
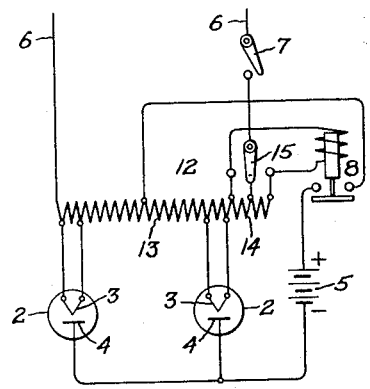

In the drawing, in which like reference characters designate like elements throughout the several views, Fig. 1 illustrates diagrammatically an embodiment of my invention which depends for its operation on the properties of an electrostatic capacitor, or condenser; Fig. 2 illustrates a modification which depends for its operation on a unidirectional conducting device; Fig. 3 illustrates another modification which depends for its operation upon the principle of electromagnetic induction, while Fig. 4 illustrates still another modification which depends for its operation on special electrical connections.

Referring now to Fig. 1 of the accompanying drawing, which illustrates a conventional type of bi-phase rectifier consisting essentially of an auto-transformer 1 and a pair of vapor electric arc discharge type unidirectional conducting devices 2. The auto-transformer is illustrated as having a one to one ratio although a transformer having any desired ratio may equally well be employed. The arc discharge devices, or bulbs, 2 are conventional elements which are well known to those skilled in the art and consist ordinarily of glass bulbs each containing a filamentary cathode 3, an anode 4, and a low pressure atmosphere of inert gas. The cathodes 3 may be heated to incandescence by any suitable means and as shown they are connected across a portion of the auto-transformer winding for this purpose. A storage battery 5, or any other suitable direct current load having a continuous or sustained countervoltage, is connected between the electrical midpoint of the transformer 1 and the anodes 4 of the rectifier bulbs. The rectifier is energized from an alternating current supply circuit 6 which is connected to the transformer 1 through a suitable control switch 7.

For preventing an arc-back in the rectifier, particularly for preventing a sustained arc-back therein which would result in discharging the battery 5, I provide a relay device 8 having contacts in circuit with the battery 5 and an operating winding connected to be energized from the auto-transformer winding. The operating winding of relay 8 may either be connected entirely across the winding, in which case it is also connected across the supply circuit 6, or it may be connected across any part of the winding of the transformer 1. A capacitor, or electrostatic condenser, 9 is connected in circuit with the operating coil of the relay 8 so as to prevent energization of this relay by a direct current voltage drop which might appear across the terminals of the auto-transformer in the event of an arc-back in the rectifier.

The operation of the arrangement illustrated in Fig. 1 is as follows: On the closure of switch 7 transformer 1 will be energized by an alternating potential and during alternate half cycles of this potential the rectifier tubes 2 will respectively alternately conduct current and block the flow of current so that direct current will flow to the battery 5 and charge it. If now switch 7 should be suddenly opened, or if the alternating current supply should fail for any reason, it will sometimes happen that very high voltages will be produced by the inductive kick of the auto-transformer winding and this high voltage may sometimes break down one of the rectifier tubes, thus causing an arc-back with the result that current will be conducted through the tube from its cathode 3 to its anode 2 instead of in the opposite direction, as is usually the case. If this arc-back takes place, the battery potential will tend to maintain it with the result that the battery may become discharged. Without the condenser 9 in circuit with the operating coil of relay 8, this relay might stay energized and thus maintain completed the arc-back circuit which is discharging the battery due to the fact that the discharging current from the battery which is maintaining the arc-back is flowing through half of the auto-transformer winding and is thus producing a voltage drop in the winding which appears across the terminals of the transformer and consequently which serves to maintain energized the operating magnet of the relay. However, condenser 9, while acting to conduct alternating current and thus maintain the relay energized during normal operation of the rectifier, prevents the flow of direct current through the operating coil of the relay and consequently as soon as switch 7 is open, or as soon as the alternating current supply fails for any reason, the relay 8 will be deenergized and will break the direct current circuit of the rectifier, thus effectively preventing an arc-back in the rectifier.

It should be understood that I have illustrated my invention as applied to a very elementary type of rectifier and that in actual practice, suitable voltage regulating switches, current smoothing reactors in the anode circuits of the tubes and other refinements which are standard practice will be incorporated.

The modified arrangement illustrated in Fig. 2 differs from the arrangement shown in Fig. 1 in that the operating coil of the relay 8 is connected across but a part of the auto-transformer 1, and a unidirectional conducting device 10, such for example as a copper oxide rectifier, is connected in circuit with the coil of the relay instead of a condenser 9 as in Fig. 1. With this arrangement, if the left hand tube 2 fails and an arc-back is produced, the direct current from battery 5 will only flow through the left hand half of the auto-transformer winding 1, and as the operating coil of the relay 8 is not connected across any portion of the auto-transformer which is conducting direct current, it will obviously not respond to the voltage drop produced by this direct current, and consequently relay 8 will break the battery circuit. If, however, the right hand tube 2 should fail, the relay 8 will be connected directly across the portion of the winding of the transformer which is conducting the arc-back current. In this case, the center, or midtap, of the transformer will be positive with respect to its right hand end and consequently by connecting rectifier 10 in such a manner as to oppose the flow of current through the relay coil from the midpoint of the transformer winding to its right hand end, this relay will drop out when the right hand tube arcs back.

In the modification shown in Fig. 3, the relay 8 is energized by means of an auxiliary winding 11 which is inductively coupled to the auto-transformer 1. As the direct current flowing in transformer 1 which is produced by an arc-back cannot induce a current in the winding 11, the relay 8 will be deenergized whenever the switch 7 is opened or the alternating current supply fails for any reason.

In the modification illustrated in Fig. 4 a step-down auto-transformer 12 is provided. The winding of this transformer consists of two parts, namely, a common winding 13 and a series winding 14. A plurality of taps are provided on the series winding 14 and a switch, or circuit controller, 15 is provided for making connection to any one of these taps, whereby the charger as a whole may be compensated, or adjusted, for variations in supply voltage. The operating magnet of the relay 8 is connected across points in the series winding 14.

The operation of the arrangement illustrated in Fig. 4 is as follows: As will be seen from the drawing, it is impossible for the arc-back current in any one of the tubes to flow through the series winding or, in other words, to flow in that portion of the transformer across which the operating coil of the relay 8 is connected. Consequently no voltage drop is produced in this portion of the winding during an arc-back, and consequently the relay will drop out whenever the switch 7 is opened or the alternating current supply 6 fails.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a winding adapted to be energized by alternating current under normal conditions and by direct current under abnormal conditions, a relay having contacts for controlling the direct current energization of said winding and means for energizing said relay from said winding when said winding is energized by alternating current and for preventing energization of said relay from said winding when said winding is energized by direct current.

2. In combination, an arc type rectifier having an auto-transformer, a direct current load having a sustained counter-voltage connected to said rectifier, a relay for disconnecting said load from said rectifier upon an arc-back in said rectifier, said relay being arranged to be energized from said auto-transformer, and means for preventing energization of said relay by said auto-transformer when said auto-transformer is energized by direct current during an arc-back in the rectifier.

3. An arc type rectifier having, in combination, an auto-transformer, said transformer having a portion of its winding arranged to carry no direct current, and a relay having an operating coil connected to be energized from said portion of the transformer winding, said relay having contacts for making and breaking the load circuit of said rectifier.

4. An arc type battery charging rectifier having in combination, a step-down auto-transformer, and a relay having its contacts connected in the output circuit of said rectifier and its operating winding connected to be energized from the series winding of said auto-transformer.

5. An arc type rectifier having, in combination, an auto-transformer, a relay for preventing sustained arc-backs in said rectifier, and means for energizing said relay by electromagnetic induction from said transformer.

6. An arc type rectifier having, in combination, an auto-transformer, a direct current output circuit, a relay having contacts for completing said output circuit, and a unidirectional conducting device, said relay being connected to be energized from said transformer through said unidirectional conducting device.

7. In an arc type battery charging rectifier system, in combination, an auto-transformer, a pair of arc discharge type unidirectional conducting elements connected to said transformer to form a bi-phase rectifier, a storage battery to be charged by said rectifier, a relay having contacts for connecting said battery to said rectifier, said relay being connected to be energized from the portion of the transformer included between one terminal thereof and the electrical midpoint of its common winding, and a unidirectional conducting device connected in circuit with said relay in such a way as to prevent energization of said relay by the direct current energization of said portion of the transformer during an arc-back in the rectifier.

RALPH D. AMSDEN.